United States Patent
Hayward et al.

(10) Patent No.: US 9,646,347 B1
(45) Date of Patent: *May 9, 2017

(54) SYSTEM AND METHOD FOR DETERMINING AND MONITORING AUTO INSURANCE INCENTIVES

(71) Applicant: STATE FARM MUTUAL AUTOMOBILE INSURANCE COMPANY, Bloomington, IL (US)

(72) Inventors: Gregory Hayward, Bloomington, IL (US); Scott T. Christensen, Salem, OR (US); Christopher E. Gay, Dallas, TX (US); Steven Cielocha, Bloomington, IL (US); Todd Binion, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/210,746

(22) Filed: Jul. 14, 2016

Related U.S. Application Data

(63) Continuation of application No. 14/862,703, filed on Sep. 23, 2015, now Pat. No. 9,418,383, which is a continuation of application No. 14/203,356, filed on Mar. 10, 2014, now Pat. No. 9,208,525.

(60) Provisional application No. 61/775,652, filed on Mar. 10, 2013.

(51) Int. Cl.
G06Q 40/08 (2012.01)
G06Q 30/02 (2012.01)

(52) U.S. Cl.
CPC ......... *G06Q 40/08* (2013.01); *G06Q 30/0207* (2013.01)

(58) Field of Classification Search
CPC .................................................... G06Q 40/08
USPC ............................................................ 705/4
See application file for complete search history.

(56) References Cited

U.S. PATENT DOCUMENTS

| | | | |
|---|---|---|---|
| 5,499,182 A | | 3/1996 | Ousborne |
| 5,797,134 A | * | 8/1998 | McMillan .......... G06Q 30/0283 705/4 |
| 6,064,970 A | * | 5/2000 | McMillan .......... G06Q 30/0283 340/439 |

(Continued)

*Primary Examiner* — Lindsay M Maguire
(74) *Attorney, Agent, or Firm* — Marshall, Gerstein & Borun LLP; Randall G. Rueth

(57) ABSTRACT

A computer system or computer-implemented method may provide incentives to an insured customer for receiving sensor data indicating risk-reducing and risk-increasing behavior during the policy term. In-vehicle sensors or other devices may gather information about the vehicle and its use during the policy term and send the information to a back-end system for analysis. Based on this analysis, the back-end system may determine that the received information is indicative of risk-reducing or increasing behavior. Upon confirmation that the information indicates risk-reducing or increasing behavior, the back-end system may perform one or more actions defined by a set of rules to establish an incentive or disincentive for the customer corresponding to the behavior. For example, the system may modify the customer's insurance policy data, send an e-mail, letter, gift card, coupon, points, or other incentive or disincentive for the customer based on the analysis.

20 Claims, 3 Drawing Sheets

(56) References Cited

U.S. PATENT DOCUMENTS

| | | |
|---|---|---|
| 6,434,510 B1 | 8/2002 | Callaghan |
| 6,831,993 B2 | 12/2004 | Lemelson et al. |
| 6,856,933 B1 | 2/2005 | Callaghan |
| 6,868,386 B1 | 3/2005 | Henderson et al. |
| 7,343,306 B1 | 3/2008 | Bates et al. |
| 7,812,712 B2 | 10/2010 | White et al. |
| 7,865,378 B2 | 1/2011 | Gay |
| 7,870,010 B2 | 1/2011 | Joao |
| 7,890,355 B2 | 2/2011 | Gay et al. |
| 7,930,098 B2 | 4/2011 | Huang et al. |
| 8,027,853 B1 | 9/2011 | Kazenas |
| 8,140,358 B1 | 3/2012 | Ling et al. |
| 8,332,242 B1 | 12/2012 | Medina, III |
| 8,423,239 B2 | 4/2013 | Blumer et al. |
| 8,489,433 B2 | 7/2013 | Altieri et al. |
| 8,508,353 B2 | 8/2013 | Cook et al. |
| 8,538,789 B1 | 9/2013 | Blank et al. |
| 8,566,126 B1 | 10/2013 | Hopkins, III |
| 8,606,512 B1 | 12/2013 | Bogovich et al. |
| 8,606,514 B2 | 12/2013 | Rowley et al. |
| 8,630,768 B2 | 1/2014 | McClellan et al. |
| 8,635,091 B2 | 1/2014 | Amigo et al. |
| 8,655,544 B2 | 2/2014 | Fletcher et al. |
| 8,682,699 B2 | 3/2014 | Collins et al. |
| 8,725,408 B2 | 5/2014 | Hochkirchen et al. |
| 9,008,956 B2 | 4/2015 | Hyde et al. |
| 9,141,996 B2 | 9/2015 | Christensen et al. |
| 9,208,525 B2 | 12/2015 | Hayward et al. |
| 9,418,383 B1 | 8/2016 | Hayward et al. |
| 2002/0026394 A1 | 2/2002 | Savage et al. |
| 2002/0111725 A1 | 8/2002 | Burge |
| 2002/0198843 A1 | 12/2002 | Wang et al. |
| 2003/0191581 A1 | 10/2003 | Ukai et al. |
| 2004/0117358 A1 | 6/2004 | von Kaenel et al. |
| 2004/0153362 A1 | 8/2004 | Bauer et al. |
| 2005/0267784 A1 | 12/2005 | Slen et al. |
| 2005/0283388 A1 | 12/2005 | Eberwine et al. |
| 2006/0075120 A1 | 4/2006 | Smit |
| 2006/0079280 A1 | 4/2006 | LaPerch |
| 2006/0247852 A1 | 11/2006 | Kortge et al. |
| 2007/0106539 A1 | 5/2007 | Gay |
| 2007/0124045 A1 | 5/2007 | Ayoub et al. |
| 2007/0299700 A1 | 12/2007 | Gay et al. |
| 2008/0051996 A1 | 2/2008 | Dunning et al. |
| 2008/0065427 A1* | 3/2008 | Helitzer .............. G06Q 40/08 705/4 |
| 2008/0174451 A1 | 7/2008 | Harrington et al. |
| 2008/0255888 A1 | 10/2008 | Berkobin et al. |
| 2009/0024419 A1 | 1/2009 | McClellan et al. |
| 2010/0030568 A1 | 2/2010 | Daman |
| 2010/0066513 A1 | 3/2010 | Bauchot et al. |
| 2010/0131304 A1 | 5/2010 | Collopy et al. |
| 2010/0138244 A1 | 6/2010 | Basir |
| 2010/0185534 A1 | 7/2010 | Satyavolu et al. |
| 2010/0238009 A1 | 9/2010 | Cook et al. |
| 2011/0153367 A1 | 6/2011 | Amigo et al. |
| 2011/0161117 A1 | 6/2011 | Busque et al. |
| 2011/0161118 A1 | 6/2011 | Borden et al. |
| 2012/0004933 A1 | 1/2012 | Foladare et al. |
| 2012/0072243 A1 | 3/2012 | Collins et al. |
| 2012/0072244 A1 | 3/2012 | Collins et al. |
| 2012/0101855 A1 | 4/2012 | Collins et al. |
| 2012/0109418 A1 | 5/2012 | Lorber |
| 2012/0109692 A1 | 5/2012 | Collins et al. |
| 2012/0158436 A1 | 6/2012 | Bauer et al. |
| 2012/0197669 A1 | 8/2012 | Kote et al. |
| 2012/0209632 A1 | 8/2012 | Kaminski et al. |
| 2012/0209634 A1 | 8/2012 | Ling et al. |
| 2012/0214472 A1 | 8/2012 | Tadayon et al. |
| 2012/0323772 A1 | 12/2012 | Michael |
| 2013/0013347 A1* | 1/2013 | Ling .............. G06Q 40/08 705/4 |
| 2013/0013348 A1 | 1/2013 | Ling et al. |
| 2013/0046646 A1 | 2/2013 | Malan |
| 2013/0110310 A1 | 5/2013 | Young |
| 2013/0144657 A1 | 6/2013 | Ricci |
| 2013/0166326 A1 | 6/2013 | Lavie et al. |
| 2013/0289819 A1 | 10/2013 | Hassib et al. |
| 2013/0304276 A1 | 11/2013 | Flies |
| 2013/0304515 A1 | 11/2013 | Gryan et al. |
| 2013/0317693 A1 | 11/2013 | Jefferies et al. |
| 2014/0019167 A1 | 1/2014 | Cheng et al. |
| 2014/0108058 A1 | 4/2014 | Bourne et al. |
| 2014/0114696 A1 | 4/2014 | Amigo et al. |
| 2014/0257867 A1 | 9/2014 | Gay et al. |
| 2014/0257871 A1 | 9/2014 | Christensen et al. |
| 2014/0257873 A1 | 9/2014 | Hayward et al. |
| 2014/0257874 A1* | 9/2014 | Hayward .............. G07C 5/00 705/4 |
| 2014/0278574 A1 | 9/2014 | Barber |

* cited by examiner

SYSTEM AND METHOD FOR DETERMINING AND MONITORING AUTO INSURANCE INCENTIVES

CROSS-REFERENCE TO RELATED APPLICATIONS

The present application is a continuation of U.S. patent application Ser. No. 14/862,703, filed Sep. 23, 2015, which is a continuation of U.S. patent application Ser. No. 14/203,356, now U.S. Pat. No. 9,208,525, filed Mar. 10, 2014, and claims the benefit of U.S. Provisional Application No. 61/775,652, filed Mar. 10, 2013. The disclosures of these applications are hereby fully incorporated by reference in their entireties.

TECHNICAL FIELD

The present disclosure generally relates to a system and method for determining and monitoring incentives for insured users of an auto insurance product.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Insurance customers typically buy a policy for a fixed amount of time and for particular coverage. For example, insurance customers apply for insurance by submitting to an evaluation of past or contemporary vehicle, driver, and other conditions and behavior. The insurance company then evaluates these conditions to determine a risk of loss for the insurance company. The customer then pays a policy premium fee to bind the insurance for a period of time, typically six months, which is based on the determined risk of loss. A higher fee is based on a higher risk of loss, and vice-versa. If, during the insured time period, the customer experiences no loss incidents, the customer may have an opportunity to renew the insurance policy at a lower premium. Thus, any benefit for the customer in reducing the possibility of loss incidents (i.e., engaging in risk-reducing behavior) occurs upon renewing the policy.

SUMMARY

A computer system or computer-implemented method may provide incentives to an insured customer for receiving sensor data indicating risk-reducing and risk-increasing behavior during the policy term. In-vehicle sensors or other devices may gather information about the vehicle and its use during the policy term and send the information to a back-end system for analysis. Based on this analysis, the back-end system may determine that the received information is indicative of risk-reducing or increasing behavior. Upon confirmation that the information indicates risk-reducing or increasing behavior, the back-end system may perform one or more actions defined by a set of rules to establish an incentive or disincentive for the customer corresponding to the behavior. For example, the system may modify insurance policy data, send an e-mail, letter, gift card, coupon, points, or other incentive or disincentive for the customer based on the analysis.

In one embodiment, a computer-implemented method may provide incentives or disincentives to an insured customer. The method may receive, via a computer network, sensor data from one or more sensors. The sensor data may include data that measures characteristics of an operating insured vehicle. The method may then determine, by one or more processors, a risk score for the received sensor data. The method may then assign, by one or more processors, the risk score to insurance policy data corresponding to the insured customer. A magnitude of the risk score may be based on a degree that the risk score exceeds a threshold. The method may then match, by one or more processors, the determined risk score to a rule. The rule may define an action to execute an incentive or a disincentive for the insured customer based on the determined risk score. The method may then execute, by one or more processors, the action.

In a further embodiment, a computer device may provide incentives or disincentives to an insured customer. The computer device may comprise one or more processors and one or more memories coupled to the one or more processors. The one or more memories may include computer executable instructions stored therein that, when executed by the one or more processors, cause the one or more processors perform various actions. For example, the instructions may cause the processor to receive sensor data from one or more sensors, the sensor data including data that measures characteristics of an operating insured vehicle. The instructions may also cause the one or more processors to determine a risk score for the received sensor data and assign the risk score to insurance policy data corresponding to the insured customer. A magnitude of the risk score may be based on a degree that the risk score a threshold. Further, the instructions may cause the processors to match the determined risk score to a rule. The rule may define an action to execute an incentive or a disincentive for the insured customer based on the determined risk score. The instructions may also cause the processors to execute the action.

In a still further embodiment, a tangible computer-readable medium may include non-transitory computer readable instructions stored thereon for providing incentives or disincentives to an insured customer. The instructions may receive sensor data from one or more sensors, the sensor data including data that measures characteristics of an operating insured vehicle. The sensors may also determine a risk score for the received sensor data and assign the risk score to insurance policy data corresponding to the insured customer, wherein a magnitude of the risk score is based on a degree that the risk score exceeds a threshold. The instructions may also match the determined risk score to a rule. The rule may define an action to execute an incentive or a disincentive for the insured customer based on the determined risk score. The instructions may also execute the action.

The features and advantages described in this summary and the following detailed description are not all-inclusive. Many additional features and advantages will be apparent to one of ordinary skill in the art in view of the drawings, specification, and claims hereof.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
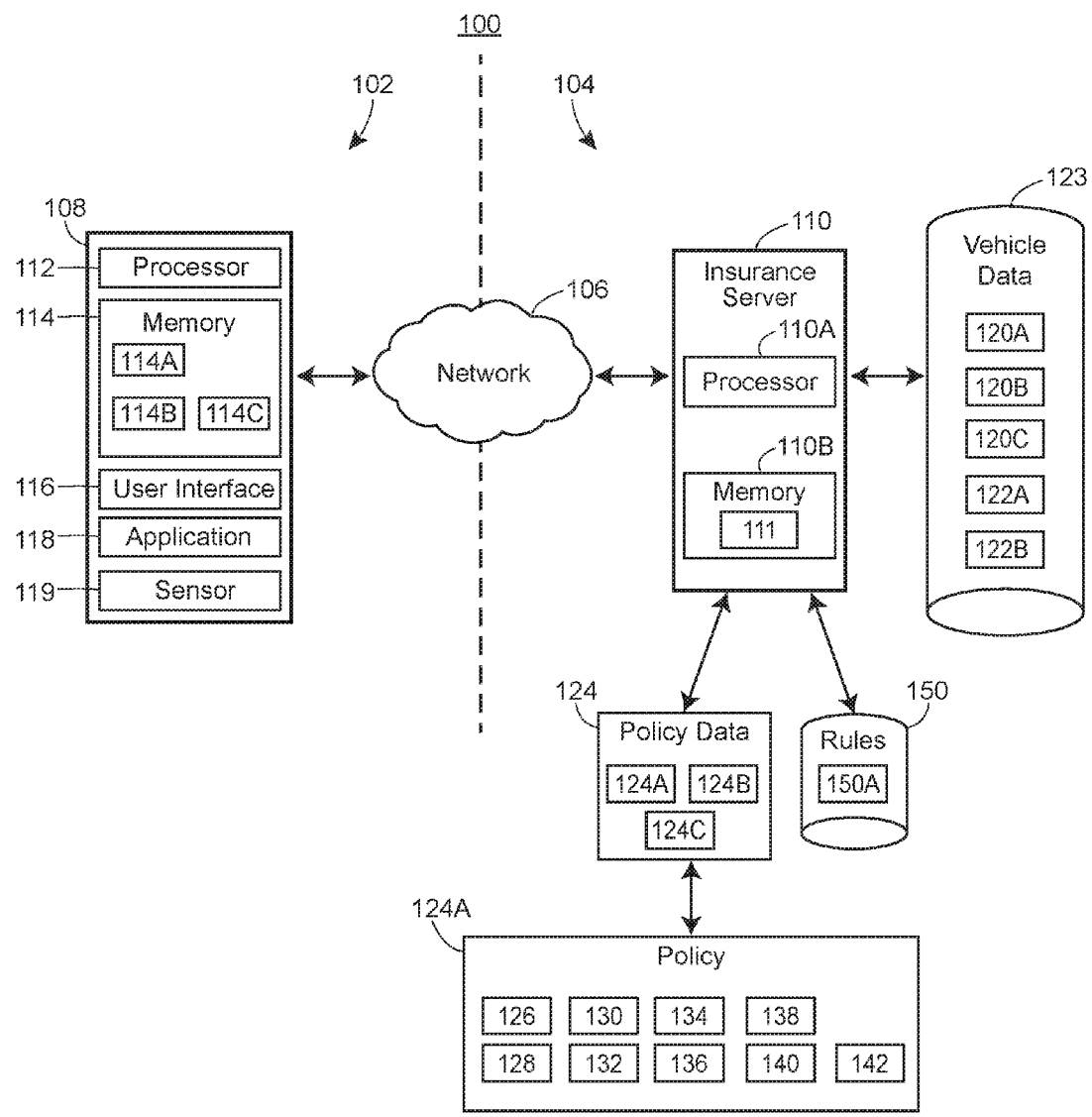
FIG. 1 is a block diagram of an example system for analyzing sensor data to determining risk-reducing behavior of customers and providing incentives to the customers.

With reference to FIG. 1, a system 100 for receiving and analyzing sensor data to determine risk-reducing behavior of customers and provide incentives to the customers may include front end components 102 and backend components 104 in communication with each other via a communication link 106 (e.g., computer network, telephone system, in-person communication, etc.). FIG. 1 illustrates a block diagram of a high-level architecture of an incentives system 100 including various software and hardware components or modules that may employ any of the methods, functions, or other code or processes described herein. The various modules may be implemented as computer-readable storage memories containing computer-readable instructions (i.e., software) for execution by a processor of the computer system 100. The modules may perform the various tasks associated with gathering, receiving, and analyzing sensor and other data related to risk-reducing customer behavior, determining and sending incentive rewards to a customer for engaging in risk-reducing behavior, and any other system function or action as described herein. The computer system 100 also includes both hardware and software applications, as well as various data communications channels for communicating data between the various hardware and software components.

The incentives system 100 may include various entities at the front end 102 that may communicate data to the backend components 104 to receive and analyze sensor data to determine risk-reducing behavior of insurance customers. For example, front end components may include a computing device 108 that is communicatively coupled to an insurance server 110 via a network 106 (e.g., a local area network, a wide area network, a mobile network, a wired or wireless network, a private network, etc.). The computing device 108 may include a processor 112, a memory 114, one or more user interfaces 116 (e.g., a display screen, a touchscreen, a keyboard, an analog control panel, etc.), a risk-related behavior data application 118, and one or more sensors 119. In general, the computing device 108 may be a smart phone, a personal digital assistant (PDA), a laptop computer, a tablet computer, etc.

After a customer purchases a fixed-term insurance policy (e.g., a six-month policy for auto insurance), the processor 112 may execute one or more instructions of the risk-reducing behavior application 118 to use the sensors 119 and other functions or modules of the front end computing device 108 belonging to the customer to collect data describing the risk-reducing or risk-increasing behavior of the customer. In some embodiments, the processor 112 may cause the application 118 to gather data 114A-C from a sensor 118 or other source. In some embodiments, the processor 112 of the mobile computing device 108 may execute one or more instructions to connect with an on-board diagnostics (OBD) system of the customer's insured vehicle. For example, the processor 112 of the mobile computing device 108 may execute one or more instructions to "pair" with the OBD system of the driver's insured vehicle using Bluetooth or other wireless technology, or a wired technology. In further embodiments, the processor 112 of the mobile computing device 108 may execute one or more instructions to start the application 118 without any connection to the vehicle's OBD system. For example, a Bluetooth signal from the vehicle may cause the application 118 to start once the customer starts the vehicle that is covered under the customer's policy. In another example, a customer may cause the mobile computing device 108 to start the application 118.

Once the application is started, the processor 108 may cause the application 118 to execute one or more instructions to gather sensor data 114A, system data 114B, and personal demographic data 114C. The sensor data may include data from an accelerometer, a camera, a GPS receiver, a microphone of the mobile computing device 108, or other data that measures vehicle characteristics while the vehicle is in operation. System data 114B may include data describing a state or condition of the mobile computing device 108 such as a beginning and ending time of a customer's driving trip (i.e., a trip start time indicating when a trip with the insured vehicle began and a trip stop time indicating when the trip ended) or when the engine was started and stopped (i.e., an engine start time indicating when an engine of the insured vehicle started and an engine stop time indicating when the engine stopped). Personal demographic data 114C may include a customer's age, home address, previous insurance claims, etc. The processor 112 may then cause the application 118 to store the gathered data 114A-C in the memory 114 and to send the data to the backend components 104 via the network 106 for analysis and determining whether the customer is engaging in risk-reducing or risk-increasing behavior.

With continued reference to FIG. 1, the insurance server 110 of the backend components 104 may be a single server or a plurality of servers with distributed processing. The server may include a processor 110A and a memory 110B. The memory 110B may store a server-side application 111 including instructions that are executable by the processor 110A to analyze the data gathered by the front-end computing device 108 to determine one or more incentives or disincentives for a customer based on the customer's driving behavior or habits under an insurance policy 124A, and send the determined incentive or disincentive to the customer.

The insurance server 110 may be coupled to a risk-related behavior data repository 120 that stores a customer's risk-related behavior as it correlates to the customer's insurance policy. In an embodiment, the insurance server 110 may receive the data 114A-114C stored in the memory 114 via the network 106. The received data 114A-114C may be stored in the risk-related behavior data repository 120 as customer driving behavior data 120A, vehicle use data 120B, left-hand turns data 120C, and other vehicle data 120D. The risk-related behavior data repository 120 may also include one or more categories of vehicle use conditions data 122A, 122B. For example, the data may include weather or other environmental conditions while the customer is driving data 122A, hazardous route data 122B, or other vehicle use conditions data 122C. The server 110 may access remote data repositories 123 that include one or more sources of vehicle use conditions data. For example, the remote data repositories 123 may include weather data indicating time and location of rain, snow, cloud cover, or other adverse weather conditions, sunrise and sunset data indicating when a customer may be driving in darkness, crime incident and location data, accident time and location data or other accident statistics that may correspond to a customer's repeated routes of travel, or any other data and statistics that may be correlated with the received data 114A-C to indicate a customer's risk-increasing or risk-reducing behavior.

A policy data repository 124 may include a plurality of customer policies 124A-C that each includes a plurality of policy characteristics. For example, a policy 124A may include a start date 126 and a renewal date 128, as well as declarations 130, definitions 132, Insuring agreement 134, exclusions 136, conditions 138, endorsements 140, and riders 142. In some embodiments, the data 114, 120, 122, 124 may be stored separately in different data repositories, and/or remotely. Declarations 130 may identify the customer including the insured's address, the insuring company, what risks or property are covered, the policy limits (i.e., amount of insurance), any applicable deductibles, the policy period and premium amount. Definitions 132 may define used in the policy data 124. The insuring agreement 134 may describe the covered perils, risks assumed, nature of the policy coverage, or refer to a contractual agreement between insurer and insured (customer). In other words, the insuring agreement 134 may summarize the promises of the insurance company to the customer, as well as stating what is covered. Exclusions 136 may define coverage that is removed from the Insuring Agreement 134 by describing property, perils, hazards or losses arising from specific causes which are not covered by the policy. Conditions 138 may describe provisions, rules of conduct, duties and obligations required for coverage under the policy. If policy conditions are not met by the insured party (i.e., the customer), the insurer can deny the claim. Endorsements 140 may describe additional items that modify the policy either unconditionally or upon the existence of some condition. Policy riders 142 may convey the terms of a policy amendment. Riders 142 may also include a date and number so that both insurer and policyholder can determine provisions and the benefit level.

A rules repository 150 may store one or more rules 150A that define conditions for determining risk-increasing or risk-reducing behavior. In some embodiments, the system 100 may cause a processor to execute an instruction of the application 111 to analyze received sensor and other data 114A-C. Analysis of the data 114A-C may include comparing customer driving behavior data 120A, vehicle use data 120B, left-hand turns data 120C, and other vehicle data 120D along with vehicle use conditions data 122A, 122B to one or more rules 150A to determine whether the customer is engaging in risk-increasing or risk-reducing behavior, and taking an action based on that determination. For example, a rule 150A may define that a customer is engaging in risk-increasing behavior if the system 100 frequently receives vehicle use data 120B corresponding to environmental conditions data 122A for adverse weather or environmental conditions (e.g., speeding while it is raining, driving at night or dusk, frequently driving in an area of high crime, frequently driving through an area with a high number of accidents, etc.). When the customer engages in risk-increasing behavior, a processor of the system 100 may execute an instruction of the application 111 to send a disincentive to the customer. A disincentive may include sending a warning message to the customer indicating that the customer's driving behavior is unsafe, and, with further warnings, the processor 104A may execute an instruction to modify one or more of the policy characteristics 126-140 to reflect the added risk. Similarly, a rule 150A may define that a customer is engaging in risk-reducing behavior if the system 100 frequently receives vehicle use data 120B corresponding to environmental conditions data 122A for favorable weather conditions. When the customer engages in risk-reducing behavior, a processor of the system 100 may execute an instruction of the application 111 to send an incentive to the customer. An incentive may include sending a message to the customer that further risk-reducing behavior will result in a reduction of policy costs or modification of one or more of the policy characteristics 126-140 to reflect the reduced risk.

A processor 104A of the insurance server 104 may execute instructions stored in a memory 104B of the insurance server 104 to retrieve data stored in the risk-related behavior data repository 120. The insurance server 104 may operate directly on the data 120A-120D provided in the risk-related behavior data repository 120, or may operate on other data that is generated based on the data 120A-120D. For example, the insurance server 104 may convert any or all of the data 120A-120D to a particular format (e.g., for efficient storage), and later utilize the modified data. In some embodiments, the risk-related behavior data repository 120 may not be directly coupled to the insurance server 104, but instead may be accessible by the insurance server 104 via a network such as the network 106.

The insurance server 104 may be configured to provide incentives for a customer to continue or engage in risk-reducing behavior during the term of an insurance policy based on received data associated with the customer's driving behavior, vehicle maintenance, vehicle usage, weather, time of day, or other driving conditions, etc. To this end, the insurance server 104 may compare the risk-related behavior data 120 with the vehicle use conditions data 122, analyze the data 120 in view of the data 122, and determine whether the customer is engaging in risk-reducing or risk-increasing behavior during the term of an insurance policy. After analyzing the data 102 and 122, the processor 104A of the server 110 may cause the server to send incentives, warnings, or other information to the customer to encourage risk-reducing behavior and discourage risk-increasing behavior during the term of a customer's insurance policy.

In one embodiment, the application 118 may record data about a trip the customer takes in his insured vehicle. Upon entering the vehicle, the processor 112 may execute one or more instructions of the application 118 to begin collecting any combination of sensor data 114A, system data 114B, and personal demographic data 114C. As described above, the processor 112 may execute an instruction to start the application 118 or begin a Bluetooth pairing process of other action that prepares the mobile device 108 in general and the application 118 in particular to gather data that indicates risk-reducing or risk-increasing behavior of the customer. Once started, the processor may execute one or more instructions of the application 118 to record a time the customer started the vehicle (system data 114B), a distance the customer drives (sensor data 114A), an average speed driven (sensor data 114A), a number of left turns made along the trip (sensor data 114A), a time the customer ended the trip (system data 114B), a neighborhood or area in which the customer drives, or any other risk-related behavior data 120. At any time during the trip or upon the vehicle terminating a Bluetooth connection to the mobile computing device 108 and/or the application 118, the processor 112 may execute an instruction of the application 118 to send the gathered data to the back end components 104 via the network connection 106.

Once received at the server 110, the processor 110A may execute one or more instructions to analyze the gathered data to determine whether the data indicates risk-reducing behavior or risk-increasing behavior. The processor may execute one or more instructions to compare the gathered data and corresponding vehicle use conditions data 122A, 122B with one or more rules 150A from the rules repository 150. For example, the server 110 may execute an instruction to compare customer driving behavior data 120A and data regarding weather or other environmental conditions 122A while the customer is driving with one or more rules 150A that determine whether the data 120A and 122A indicates risk-increasing or risk-reducing customer behavior. According to the one or more rules 150A, driving behavior data 120A indicating that the customer is driving in a manner that is inappropriate for the weather data 122A corresponds to risk-increasing behavior, while driving behavior data 120A indicating that the customer is driving in a manner that is appropriate for the weather data 122A corresponds to risk-reducing behavior. Thus, the server 110 may execute a further instruction to send a message or other indication to the customer that provides a disincentive for risk-increasing behavior or an incentive for risk-reducing behavior.

Figure 2:
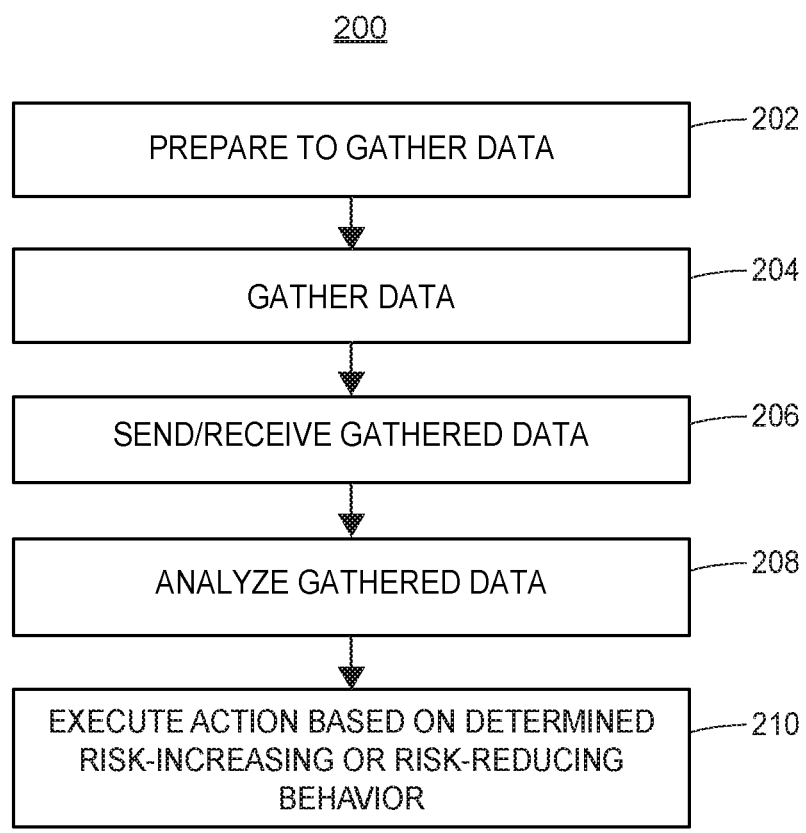
FIG. 2 is a flow diagram of an example method for analyzing data to determine risk-reducing behavior of customers and providing incentives to the customers.

The system 100 described herein may be employed in a method 200 (FIG. 2) to provide incentives or disincentives to an insured customer during the term of an insurance policy or after an insurance policy has expired in return for receiving sensor data indicating risk-reducing behavior or risk-increasing behavior during the policy term. The method 200 may include one or more functions or routines in the form of non-transitory computer-executable instructions that are stored in a tangible computer-readable storage medium and executed using a processor of a computing device (e.g., the computing device 108, the server 110, or any combination of computing devices within the system 100). The routines may be included as part of any of the modules or instructions described in relation to FIG. 1, or as part of a module that is external to the system illustrated by FIGS. 1 and 3.

At function 202, the method may cause a processor of the system 100 to prepare for gathering data that is indicative of the customer's driving habits. For example, after a customer purchases a fixed-term insurance policy, the processor 112 of the mobile computing device 108 may execute one or more instructions to access a risk-related behavior application 118. For example, after installation on the computing device 108, the function 202 may execute one or more instructions to "pair" the application 118 with the OBD system of the driver's insured vehicle using Bluetooth or other wireless technology, or a wired technology. In further embodiments, the function 202 may cause the processor 112 of the mobile computing device 108 to execute one or more instructions to start the application 118 without any connection to the vehicle's OBD system. For example, a Bluetooth signal from the vehicle may cause the application 118 to prepare to gather data once the customer starts the vehicle that is covered under the customer's policy. In another example, a customer may select an icon for the application and cause the mobile computing device 108 to start the application 118.

At function 204, the method 200 may cause a processor of the system 100 to execute another instruction to gather or receive sensor data 114A, system data 114B, and personal demographic data 114C. For example, with consent from the customer, the application 118 executing on the mobile computing device 108 may execute an instruction to gather data from various components of the mobile computing device. For example, the instruction may gather data from an accelerometer, a camera, a GPS receiver, or a microphone of the mobile computing device 108. In other embodiments, the OBD system of the customer's insured vehicle may provide data 114 to the application 118. As described above, the data 114 may include a time the engine was started, a distance the customer drives, an average speed driven, a number of left turns made along the trip, a time the engine stopped or the customer ended the trip, or any other risk-related behavior data.

Function 204 may also cause a processor of the system 100 to execute an instruction to gather vehicle use conditions data 122A, 122B that describes one or more of environmental, accident, or crime data corresponding to geographic locations. For example, executing the instruction may cause the server 110 to access one or more remote data repositories 123 to gather the vehicle use conditions data 122A, 122B. For example, the function 204 may cause a processor of the system 100 to execute an instruction to request one or more of weather data indicating time and location of rain, snow, cloud cover, or other adverse weather conditions, sunrise and sunset data indicating when a customer may be driving in darkness, crime incident and location data, accident time and location data or other accident statistics that may correspond to a customer's repeated routes of travel, or any other data and statistics that may be correlated with the received data 114A-C to indicate a customer's risk-increasing or risk-reducing behavior. The function 204 may also cause a processor of the system 100 to execute an instruction to store the gathered vehicle use conditions data 122A, 122B within the repository 120.

At function 206, the method 200 may cause a processor of the system 100 to execute an instruction to send the gathered data 114 to the backend components 104. In some embodiments, the function 206 causes a processor of the system 100 to send the gathered data 114 via the network connection 106 to the insurance server 110. The server 110 may then execute a further instruction to store the gathered data 114 in a repository 120. The function 206 may send the gathered data 114 to the backend 104 periodically or upon completion of a customer's trip. For example, the function 206 may send the data upon termination of a Bluetooth connection with the customer's vehicle, upon receiving a signal that the customer has shut off the engine, or upon detecting another event or signal using the application 118. The function 206 may execute an instruction to store the gathered sensor data 114A, system data 114B, and personal demographic data 114C within the repository 120 separately as customer driving behavior data 120A, vehicle use data 120B, left-hand turns data 120C, and other vehicle data 120D.

At function 208, the method 200 may cause a processor of the system 100 to execute an instruction to analyze the gathered data 114 that is stored in the repository 120. In some embodiments, the application 111 may include an instruction that is executable by the processor 110A to analyze the data 120A-D that correlates to or matches the data 122A-B against one or more rules 150A of the rules data repository 150. The function 208 may include one or more instructions to determine which of the gathered data 120A-D corresponds to or matches the vehicle use conditions data 122A, 122B. For example, the function 208 may determine that driving behavior data 120A indicating the driver was speeding corresponds to or matches a time and location when environmental conditions data 122A also indicates that it was raining in the area the customer was driving. Likewise, the function 208 may determine that driving behavior data 120A indicating the driver was travelling slower than the posted speed limit corresponds to a time and location when environmental conditions data 122A also indicates that it was raining in the area the customer was driving. Of course, the function 208 may include one or more instructions to determine which of any of the gathered data 120A-D corresponds or correlates to any of the vehicle use conditions data 122A, 122B. For example, if any of the gathered data 120A-D and the vehicle use conditions data 122A, 122B have the same time or location, or are within a threshold value of a time and location, then that data corresponds to each other.

Once the function 208 executes the instruction to determine which, if any, data 120A-D corresponds to or matches any of the data 122A, 122B by time, location, or other factor, then the function 208 may execute an instruction to determine if the matched data 120A-D and 122A,B also corresponds to one or more of the rules 150A. In some embodiments, a rule may define conditions for determining risk-increasing or risk-reducing behavior. For example, a rule 105A may include conditions of the customer speeding or reducing his or her speed (customer driving behavior data 120A) while it is also raining (environmental conditions data 122A) for determining that the customer is engaging in risk-reducing or increasing behavior. The rule may also assign a score to the risk-reducing or increasing behavior. For example, if the data 120A indicates the customer is travelling at twenty miles per hour over the posted speed limit for a road indicated by the vehicle use conditions data 122A, 122B, then the rule may assign a score indicating a higher degree of risk-increasing behavior than if the data 120A indicates the customer is travelling at one mile per hour over the posted speed limit. Similarly, if the data 120A indicates the customer only makes an average of one left-hand turn during a trip, then the rule may assign a score indicating a lower degree of risk-increasing behavior than if the data 120A indicated that the customer averaged five left-hand turns per trip. The function 208 may also track the scores to determine a level or total score for each customer's risk-increasing or risk-reducing behavior.

At function 210, the method 200 may cause a processor of the system 100 to execute an instruction to take an action based on the risk-increasing or risk-reducing behavior determined by function 208. In some embodiments, the function 210 may execute an instruction to send a message to a customer indicating risk-reducing behavior or risk-increasing behavior each time the customer completes a trip and one of the behaviors is determined. In other embodiments, the function 210 may execute an instruction to send a message to a customer indicating risk-reducing behavior or risk-increasing behavior only when the customer reaches a threshold value or score for each behavior. For example, where a customer's risk-reducing score reaches fifty or some other threshold number, then the function may send a message to reinforce that behavior. Similarly, where a customer's risk-increasing score reaches fifty or some other threshold value, then the function 210 may send a message to discourage that behavior.

In other embodiments, the function 210 may execute an instruction whereby the function takes some action based on a points balance. For example, where the customer has earned two-hundred risk-reducing points, but then earns fifty risk-increasing points, the function 210 may withhold taking an action to discourage the customer because, in the balance, the customer's behavior is still much more risk-reducing than risk increasing. In further embodiments, a device may include an indication of how the customer is performing in the balance of risk-increasing or risk-reducing behavior. For example, a computer device including colored LEDs may indicate a greenish color when the customer is, in the balance, engaging in more risk-reducing behavior than risk-increasing behavior (e.g., when an insured customer's risk score exceeds a threshold number). Likewise, the device may indicate a reddish color when the customer is, in the balance, engaging in more risk-increasing behavior than risk-reducing behavior.

In further embodiments, the function 210 may execute an instruction to modify the customer's policy based on the customer's risk-increasing or risk-reducing behaviors as determined at function 208. For example, the function 210 may execute one or more instructions to modify policy data 124 corresponding to a customer that is engaging in risk-increasing or risk-reducing behavior. The modification may occur at one or more of a renewal period for the policy, or may occur during a period when the policy is currently active. Function 210 may modify any of the start date 126, renewal date 128, declarations 130, definitions 132, exclusions 134, conditions 136, endorsements 138, and riders 140. For example, the function 210 may include and instruction that modifies a policy limit within the declarations 130 when a customer engages in risk-increasing behavior that exceeds a threshold amount (e.g., increases a premium when the customer exceeds a number of miles allowed under the policy, sends a warning about possible non-renewal or increased premiums when the customer exceeds the posted speed limit for a period of time that exceeds a threshold, etc.). Likewise, the function 210 may include and instruction that modifies a policy limit within the declarations 130 when a customer engages in risk-reducing behavior that exceeds a threshold amount (e.g., lowers a premium when the customer drives fewer than a threshold number of miles allowed under the policy, sends a gift card or other encouragement or a message about possibly lowered premiums when the customer consistently obeys the posted speed limit for a period of time that exceeds a threshold, etc.).

Thus, as described herein, a computer system or computer-implemented method may provide incentives to an insured customer during the term of a policy or after the policy has expired for receiving sensor data indicating risk-reducing and risk-increasing behavior during the policy term. In-vehicle sensors or other devices may gather information about the vehicle and its use during the policy term and send the information to a back-end system for analysis. Based on this analysis, the back-end system may determine that the received information is indicative of risk-reducing or increasing behavior. Upon confirmation that the information indicates risk-reducing or increasing behavior, the back-end system may perform one or more actions defined by a set of rules to establish an incentive or disincentive to the customer corresponding to the behavior. For example, the system may modify insurance policy data, send an e-mail, letter, gift card, coupon, points, or other incentive or disincentive to the customer based on the analysis.

Figure 3:
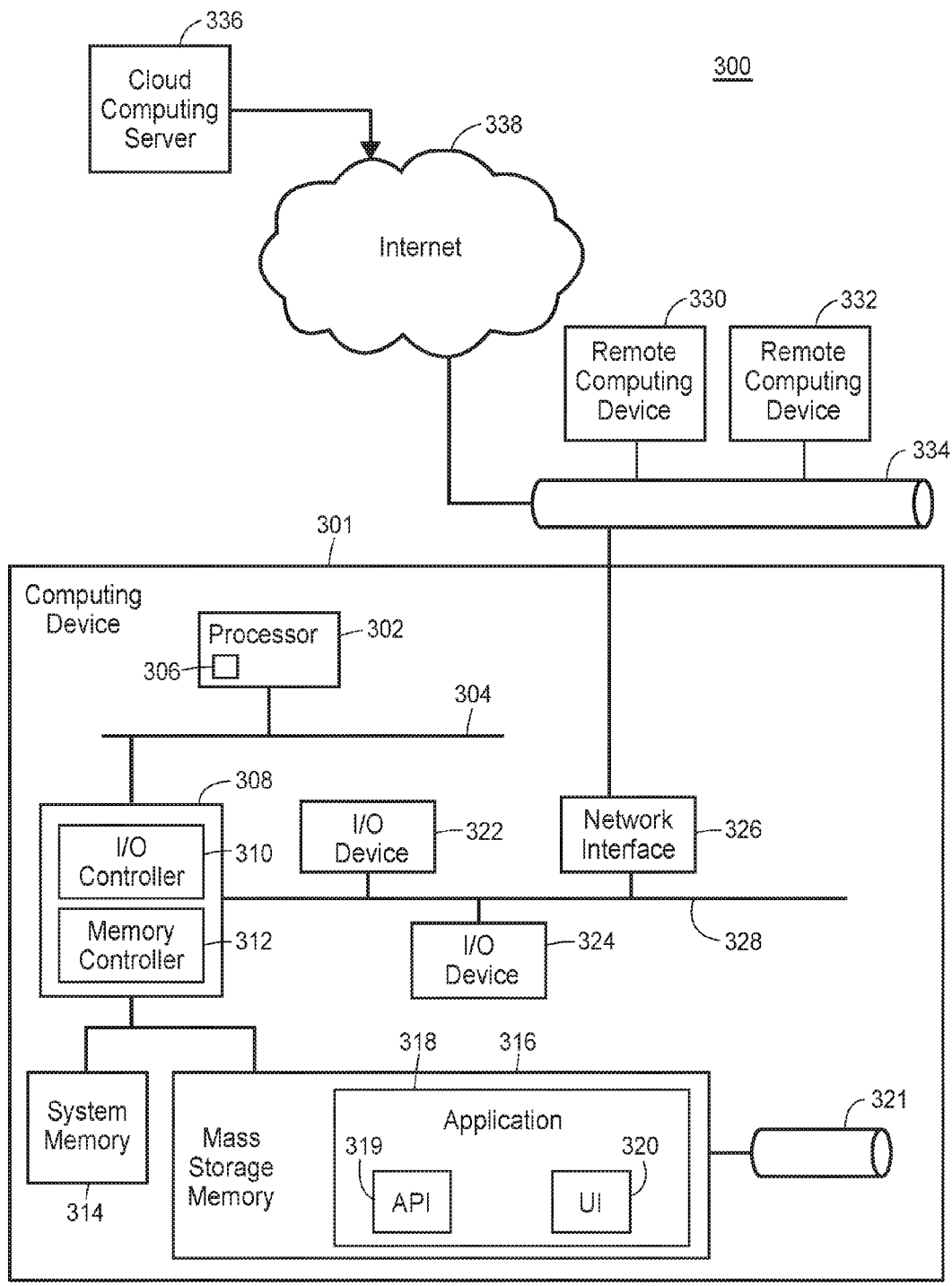
FIG. 3 is a block diagram of a computing environment that implements a system and method for analyzing data to determine risk-reducing behavior of customers and providing incentives to the customers based on confirmation of such behavior.

FIG. 3 is a high-level block diagram of an example computing environment for a system and method to provide incentives and disincentives to an insured customer during the term of a policy or after the policy is expired for receiving sensor data indicating risk-reducing and risk-increasing behavior during the policy term. The computing device 301 may include a server, a client computing device (e.g., a personal computer, a tablet computer, a Wi-Fi-enabled device, cellular phone, or other computing device capable of wireless or wired communication), a thin client, or other known type of computing device. As will be recognized by one skilled in the art, in light of the disclosure and teachings herein, other types of computing devices can be used that have different architectures. Processor systems similar or identical to the example system 300 may be used to implement and execute the example system of FIG. 1 and the example method of FIG. 2, and the like. Although the example system 300 is described below as including a plurality of peripherals, interfaces, chips, memories, etc., one or more of those elements may be omitted from other example processor systems used to implement and execute the example system 100, 300 including a computer system or computer-implemented method to provide incentives to an insured customer during the term of a policy for receiving sensor data indicating risk-reducing and risk-increasing behavior during the policy term, a risk-related behavior data application 118, various sensors 119, etc. Also, other components may be added.

As shown in FIG. 3, the computing device 301 includes a processor 302 that is coupled to an interconnection bus 304. The processor 302 includes a register set or register space 306, which is depicted in FIG. 3 as being entirely on-chip, but which could alternatively be located entirely or partially off-chip and directly coupled to the processor 302 via dedicated electrical connections and/or via the interconnection bus 304. The processor 302 may be any suitable processor, processing unit or microprocessor. Although not shown in FIG. 3, the computing device 301 may be a multi-processor device and, thus, may include one or more additional processors that are identical or similar to the processor 302 and that are communicatively coupled to the interconnection bus 304.

The processor 302 of FIG. 3 is coupled to a chipset 308, which includes a memory controller 310 and a peripheral input/output (I/O) controller 312. As is well known, a chipset typically provides I/O and memory management functions as well as a plurality of general purpose and/or special purpose registers, timers, etc. that are accessible or used by one or more processors coupled to the chipset 308. The memory controller 310 performs functions that enable the processor 302 (or processors if there are multiple processors) to access a system memory 314 and a mass storage memory 316.

The system memory 314 may include any desired type of volatile and/or non-volatile memory such as, for example, static random access memory (SRAM), dynamic random access memory (DRAM), flash memory, read-only memory (ROM), etc. The mass storage memory 316 may include any desired type of mass storage device. For example, if the computing device 301 is used to implement an incentives system 100, 300 having an API 319 (including functions and instructions as described by the method 200 of FIG. 2, and the risk-reducing behavior application 118 to receive user input (e.g., sensor data, policy data, system data, demographic data customer driving behavior data 120A, vehicle use data 120B, left-hand turns data 120C, and other vehicle data 120D, etc.), the mass storage memory 316 may include a hard disk drive, an optical drive, a tape storage device, a solid-state memory (e.g., a flash memory, a RAM memory, etc.), a magnetic memory (e.g., a hard drive), or any other memory suitable for mass storage. In one embodiment, non-transitory program functions, modules and routines (e.g., method 200, etc.) are stored in mass storage memory 316, loaded into system memory 314, and executed by a processor 302 or can be provided from computer program products that are stored in tangible computer-readable storage mediums (e.g. RAM, hard disk, optical/magnetic media, etc.). Mass storage 316 may also include a cache memory 321 storing application data, user profile data, and timestamp data corresponding to the application data, and other data for use by the application 318.

The peripheral I/O controller 310 performs functions that enable the processor 302 to communicate with peripheral input/output (I/O) devices 322 and 324, a network interface 326, via a peripheral I/O bus 328. The I/O devices 322 and 324 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O devices 322 and 324 may be used with the application 318 to provide an interface for the systems 100, 300 as described in relation to the figures. The local network transceiver 328 may include support for Wi-Fi network, Bluetooth, Infrared, cellular, or other wireless data transmission protocols. In other embodiments, one element may simultaneously support each of the various wireless protocols employed by the computing device 301. For example, a software-defined radio may be able to support multiple protocols via downloadable instructions. In operation, the computing device 301 may be able to periodically poll for visible wireless network transmitters (both cellular and local network) on a periodic basis. Such polling may be possible even while normal wireless traffic is being supported on the computing device 301. The network interface 326 may be, for example, an Ethernet device, an asynchronous transfer mode (ATM) device, an 802.11 wireless interface device, a DSL modem, a cable modem, a cellular modem, etc., that enables the system 100, 300 to communicate with another computer system having at least the elements described in relation to the systems 100, 300.

While the memory controller 312 and the I/O controller 310 are depicted in FIG. 3 as separate functional blocks within the chipset 308, the functions performed by these blocks may be integrated within a single integrated circuit or may be implemented using two or more separate integrated circuits. The system 300 may also implement the insurance system server 110 and various system modules on client computing devices 108. The remote computing devices 330 and 332 may communicate with the computing device 301 over a network link 334. For example, the computing device 301 may receive vehicle data 120 created by an application executing on a remote computing device 330, 332. In some embodiments, the application 318 including the risk-related behavior data application 118 may be retrieved by the computing device 301 from a server 336 via the Internet 338. When using the cloud computing server 336, the retrieved application 318 may be programmatically linked with the computing device 301. The application 318 may be a Java® applet executing within a Java® Virtual Machine (JVM) environment resident in the computing device 301 or the remote computing devices 330, 332. The application 318 may also be a web-based application (e.g., the risk-related behavior data application 118 of FIG. 1) adapted to execute in a web-browser located on the computing devices 301, 330, and 332. In some embodiments, the application 318 may communicate with back end components 340 via the Internet 338 or other type of network.

Using the system 100 and method 200 described herein, the risk-related behavior data application 118 and various interfaces 320 coupled with the method 200 may allow a computer system or computer-implemented method to provide incentives to an insured customer during the term of a policy or after the policy is expired for receiving sensor data indicating risk-reducing and risk-increasing behavior during the policy term.

The following additional considerations apply to the foregoing discussion. Throughout this specification, plural instances may implement functions, modules, components, operations, or structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the network 338 may include but is not limited to any combination of a LAN, a MAN, a WAN, a mobile, a wired or wireless network, a private network, or a virtual private network. Moreover, while only one portal 108 is illustrated in FIG. 1 to simplify and clarify the description, it is understood that any number of instances of the risk-related behavior data application 118 are supported and can be in communication with the systems 100 and 300.

Additionally, certain embodiments are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain functions. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data and data structures stored as bits or binary digital signals within a machine memory (e.g., a computer memory). These algorithms or symbolic representations are examples of techniques used by those of ordinary skill in the data processing arts to convey the substance of their work to others skilled in the art. As used herein, a "method" or a "function" or an "algorithm" or a "routine" is a self-consistent sequence of operations or similar processing leading to a desired result. In this context, methods, functions, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a function, process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a computer system 100, 600 for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a computer system or computer-implemented method to provide incentives to an insured customer during the term of a policy or after the policy is expired for receiving sensor data indicating risk-reducing and risk-increasing behavior during the policy term through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for providing incentives to an insured customer during the term of an insurance policy, the method comprising:
    receiving, via a computer network, sensor data from at least one sensor, the sensor data (i) including data that measures a set of characteristics of an operating insured vehicle, and (ii) sent by the at least one sensor in real time during operation of the operating insured vehicle;
    accessing vehicle conditions data including data related to an environment at a particular location;
    once the sensor data is received from the at least one sensor:
        determining, based on the vehicle conditions data, that the operating insured vehicle is operating at the particular location, and
        determining, based on the vehicle conditions data and the sensor data, that the insured customer is engaging in risk-reducing behavior;
    calculating a risk score for the insured customer, the risk score based on the risk-reducing behavior engaged in by the insured customer;
    determining, by a processor, an incentive action to execute for the insured customer based on the risk score; and
    executing, by the processor, the incentive action.

2. The computer-implemented method of claim 1, wherein executing the incentive action comprises at least one of:
    sending a communication indicating the incentive action to the insured customer; and
    modifying an insurance policy data associated with the insured customer.

3. The computer-implemented method of claim 1, further comprising:
    receiving, via the computer network, system data including a trip start time indicating when a trip with the insured vehicle began, and a trip stop time indicating when the trip ended.

4. The computer-implemented method of claim 1, wherein accessing the vehicle conditions data comprises accessing the vehicle conditions data from a remote data repository, the vehicle conditions data describing one or more of environmental data, accident data, traffic data, roadway data, or crime data corresponding to the particular location.

5. The computer-implemented method of claim 4, wherein the environmental data includes weather data indicating time and location of rain, snow, cloud cover, or other adverse weather conditions, or sunrise and sunset data that correspond to the particular location.

6. The computer-implemented method of claim 1, further comprising:
causing, by one or more processors, the at least one sensor to pair with an on-board data system of the operating insured vehicle.

7. The computer-implemented method of claim 1, wherein the one or more sensors includes a component of a mobile computing device, the component including one or more of an accelerometer, a gyroscope, a magnetometer, a camera, a GPS receiver, or a microphone.

8. The computer-implemented method of claim 1, wherein the sensor data includes one or more of an engine start time indicating when an engine of the operating insured vehicle started, an engine stop time indicating when the engine stopped, a distance the operating insured vehicle moved between the engine start time and the engine stop time, an average speed the operating insured vehicle traveled along the distance, and a number of driving events made by the operating insured vehicle along the distance.

9. The computer-implemented method of claim 1, wherein the at least one sensor is in communication with both a mobile computing device and the operating insured vehicle.

10. The computer-implemented method of claim 1, further comprising:
causing at least one light to indicate that the insured customer is engaging in the risk-reducing behavior.

11. A computer device for providing incentives to an insured customer during the term of an insurance policy, the computer device comprising:
a transceiver configured to communicate via a computer network;
at least one processor;
a memory coupled to the at least one processor; and
computer executable instructions stored in the memory that, when executed by the at least one processor, cause the at least one processor to:
receive, via the communication module, sensor data from at least one sensor, the sensor data (i) including data that measures a set of characteristics of an operating insured vehicle, and (ii) sent by the at least one sensor in real time during operation of the operating insured vehicle,
access vehicle conditions data including data related to an environment at a particular location,
once the sensor data is received from the at least one sensor:
determine, based on the vehicle conditions data, that the operating insured vehicle is operating at the particular location, and
determine, based on the vehicle conditions data and the sensor data, that the insured customer is engaging in risk-reducing behavior,
calculate a risk score for the insured customer, the risk score based on the risk-reducing behavior engaged in by the insured customer,
determine an incentive action to execute for the insured customer based on the risk score, and
execute the incentive action.

12. The computer device of claim 11, wherein to execute the incentive action, the processor is configured to at least one of:
send, via the transceiver, a communication indicating the incentive action to the insured customer, and
modify an insurance policy data associated with the insured customer.

13. The computer device of claim 11, wherein the computer executable instructions, when executed by the at least one processor, further cause the at least one processor to:
receive, via the transceiver, system data including a trip start time indicating when a trip with the insured vehicle began, and a trip stop time indicating when the trip ended.

14. The computer device of claim 11, wherein to access the vehicle conditions data, the processor is configured to:
access the vehicle conditions data from a remote data repository, the vehicle conditions data describing one or more of environmental data, accident data, traffic data, roadway data, or crime data corresponding to the particular location.

15. The computer device of claim 14, wherein the environmental data includes weather data indicating time and location of rain, snow, cloud cover, or other adverse weather conditions, or sunrise and sunset data that correspond to the particular location.

16. The computer device of claim 11, wherein the computer executable instructions, when executed by the at least one processor, further cause the at least one processor to:
cause the at least one sensor to pair with an on-board data system of the operating insured vehicle.

17. The computer device of claim 11, wherein the one or more sensors includes a component of a mobile computing device, the component including one or more of an accelerometer, a gyroscope, a magnetometer, a camera, a GPS receiver, or a microphone.

18. The computer device of claim 11, wherein the sensor data includes one or more of an engine start time indicating when an engine of the operating insured vehicle started, an engine stop time indicating when the engine stopped, a distance the operating insured vehicle moved between the engine start time and the engine stop time, an average speed the operating insured vehicle traveled along the distance, and a number of driving events made by the operating insured vehicle along the distance.

19. The computer device of claim 11, wherein the at least one sensor is in communication with both a mobile computing device and the operating insured vehicle.

20. The computer device of claim 11, wherein the computer executable instructions, when executed by the at least one processor, further cause the at least one processor to:
cause at least one light to indicate that the insured customer is engaging in the risk-reducing behavior.

* * * * *